US011115520B2

(12) United States Patent
McCourt et al.

(10) Patent No.: US 11,115,520 B2
(45) Date of Patent: Sep. 7, 2021

(54) SIGNAL DISCOVERY USING ARTIFICIAL INTELLIGENCE MODELS

(71) Applicant: Invoca, Inc., Santa Barbara, CA (US)

(72) Inventors: Michael McCourt, Santa Barbara, CA (US); Sean Storlie, Santa Barbara, CA (US); Victor Borda, Santa Barbara, CA (US); Michael Lawrence, Santa Barbara, CA (US); Anoop Praturu, Santa Barbara, CA (US)

(73) Assignee: Invoca, Inc., Santa Barbara, CA (US)

( * ) Notice: Subject to any disclaimer, the term of this patent is extended or adjusted under 35 U.S.C. 154(b) by 0 days.

(21) Appl. No.: 16/897,568

(22) Filed: Jun. 10, 2020

(65) Prior Publication Data

US 2021/0120121 A1 Apr. 22, 2021

Related U.S. Application Data

(60) Provisional application No. 62/923,329, filed on Oct. 18, 2019, provisional application No. 62/980,092, filed on Feb. 21, 2020.

(51) Int. Cl.
*H04M 3/22* (2006.01)
*G10L 15/18* (2013.01)
(Continued)

(52) U.S. Cl.
CPC .......... *H04M 3/2218* (2013.01); *G06F 16/45* (2019.01); *G06N 7/005* (2013.01); *G10L 15/1815* (2013.01); *G10L 15/197* (2013.01)

(58) Field of Classification Search
CPC .......... H04M 3/2218; H04M 2201/40; H04M 3/42221; G06N 7/005; G10L 15/197;
(Continued)

(56) References Cited

U.S. PATENT DOCUMENTS 10,388,272 B1 * 8/2019 Thomson .............. G10L 15/063
2012/0269185 A1 * 10/2012 Castleman .......... H04L 65/4007
370/352

(Continued)

*Primary Examiner* — Marcus Hammonds
(74) *Attorney, Agent, or Firm* — Baker Botts L.L.P.

(57) ABSTRACT

Systems and methods for improving call topic models are described herein. In an embodiment a server computer receives call transcript data comprising an electronic digital representation of a verbal transcription of a call between a first person of a first person type and a second person of a second person type. The server computer splits the call transcript data into first person type data comprising words spoken by the first person in the call and second person type data comprising words spoken by the second person type in the call. The server computer uses a stored topic model to determine a topic of the call, the topic model simultaneously modeling the first person type data as a function of a first probability distribution of words used by the first person type for one or more topics and the second person type data as a function of a second probability distribution of words used by the second person type for the one or more topics, both the first probability distribution of words and the second probability distribution of words being modeled as a function of a third probability distribution of words for the one or more topics. The server computer then stores a data record identifying the topic of the call and/or stores data identifying the topic of the call with the call transcripts.

18 Claims, 7 Drawing Sheets

(51) Int. Cl.
*G10L 15/197* (2013.01)
*G06F 16/45* (2019.01)
*G06N 7/00* (2006.01)

(58) Field of Classification Search
CPC .......... G06F 16/45; G06F 40/30; G06F 40/35; G06F 16/3334; G06F 16/3329; G01L 15/1815; G01L 15/1822
See application file for complete search history.

(56) References Cited

U.S. PATENT DOCUMENTS

| | | | |
|---|---|---|---|
| 2016/0316059 A1* | 10/2016 | Nuta | G06Q 10/04 |
| 2017/0075991 A1* | 3/2017 | Kataria | G06F 16/337 |
| 2017/0206893 A1* | 7/2017 | Achituv | G10L 15/01 |
| 2018/0309873 A1* | 10/2018 | Raanani | G06F 40/289 |
| 2020/0349953 A1* | 11/2020 | Qin | G10L 15/26 |

\* cited by examiner

SIGNAL DISCOVERY USING ARTIFICIAL INTELLIGENCE MODELS

CROSS-REFERENCE TO RELATED APPLICATIONS; BENEFIT CLAIM

This application claims the benefit of provisional application 62/923,329, filed Oct. 18, 2019, and provisional application 62/980,092, filed Feb. 21, 2020, the entire contents of which are hereby incorporated by reference for all purposes as if fully set forth herein, under 35 U.S.C. § 119(e).

TECHNICAL FIELD

One technical field of the disclosure is computer-implemented artificial intelligence models that are programmed to derive semantics such as topics from a natural language dataset such as a transcript of a voice call communicated between a calling person and a called entity. Another technical field of the disclosure is improvements to Bayesian Belief Network models and model generation techniques.

BACKGROUND

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Topic modeling in written and verbal communications can be extremely useful for grouping a large number of communications for review, analysis, or intervention. While there are many techniques for topic modeling of written communications, a lot of those techniques are insufficient for verbal communications which include a greater degree of variation between people discussing the same topic.

Neural networks and other structured machine learning algorithms are difficult to use for topic modeling as they require annotated training data and do not provide results that are easy to interpret. Thus, unsupervised learning models, such as the latent Dirichlet allocation model (LDA), are often used for topic modeling. The LDA model models topics in a plurality of calls based on the words spoken in the call. While the LDA model is often useful for written communications, the LDA model tends to underperform on oral communications for a few reasons.

A first problem with the LDA model is that it treats all words on the call as equal when performing topic modeling. This assumption causes words spoken by one party to be treated the same as words spoken by the other party. Given differences in speech patterns and word usage between a caller and an agent, the intermingling of language can lead to calls being misidentified due to the language used by the agent or caller skewing the model. Additionally, different calls may have a different proportion of the call where the agent speaks versus where the caller speaks, further causing the model to categorize calls incorrectly based on how much language of one party is used.

A second problem with the LDA model is that it assumes that people will generally use the same language to discuss the same topic. While this may be true with written conversations, speech patterns and word usage in verbal conversations often vary based on locality and person. Thus, the LDA model tends to generate different topics for different regions or different people based on differing language usage despite the same topic being discussed. For instance, the LDA model may generate a first topic that corresponds to purchasing a car in the Northwest United States and a second topic that corresponds to purchasing a car in Southern California.

A third problem with the LDA model is that it uses a flat prior distribution as the basis for both the distribution of topics and the distribution of words. A flat prior distribution gives equal probability for each topic to be pulled from the distribution. By using a flat prior distribution, the LDA model assumes an equal likelihood of any of a plurality of topics being discussed. This assumption ignores the realities of most businesses that may use a topic model: that some topics are discussed more often than others. For example, a client of a car dealership may only buy a car once every 5 years, but the client may bring the car in for repairs once a year. Thus, repair appointment conversations will be much more common than car purchasing appointments. Other topics may be rare but highly distinctive, such as calls associated with fraud. While these calls are important and need to be factored into a topic model, they may be much rarer than scheduling calls.

Thus, there is a need for improved artificial intelligence models for modeling topics from phone conversations.

DETAILED DESCRIPTION

Figure 1:
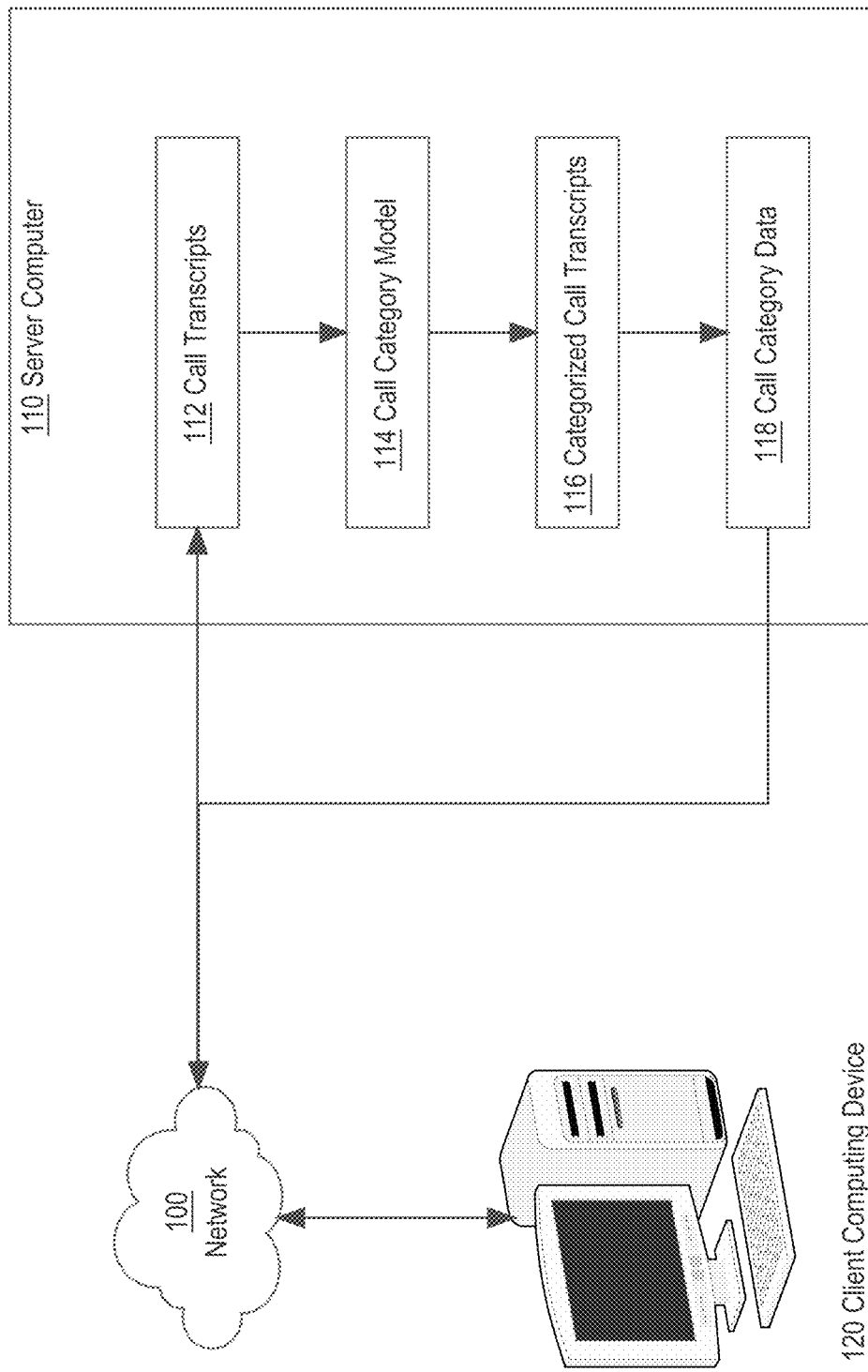
FIG. 1 depicts an example system for performing topic modeling on call transcripts.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1.0 GENERAL OVERVIEW
2.0 STRUCTURAL OVERVIEW
3.0 FUNCTIONAL OVERVIEW
4.0 TOPIC MODELS
   4.1 LATENT DIRICHLET ALLOCATION TOPIC MODEL
   4.2 IMPROVED TOPIC MODEL FOR CALLS
   4.3 IMPROVED TOPIC MODEL WITH PARTY SEGREGATION 4.4 TOPIC MODEL GENERATOR
5.0 TOPIC DISPLAY
6.0 IMPLEMENTATION EXAMPLE—HARDWARE OVERVIEW

1.0 General Overview

Improvements to topic modeling are described herein for use in computer-implemented artificial intelligence models that are programmed to derive semantics such as topics from a natural language dataset such as a transcript of a voice call communicated between a calling person and a called entity. The disclosure also addresses improvements to Bayesian Belief Network models and model generation techniques. In an embodiment, a server computer stores a topic which improves on previous topic models by simultaneously modeling words spoken by a first party type as a function of words used by the first person type for various topics and modeling words spoken by a second party type as a function of words used by the second person type for the various topics. Both of the aforementioned models are then modeled, either directly or indirectly, on a probability distribution of words for the various topics. When call transcripts are received, the model is used to determine one or more topics for each of the calls.

In an embodiment, the model is further improved by modeling the probability distribution of words as a function of an inferred prior distribution which is modeled as a function of a flat prior distribution. A similar improvement may be performed on the topic side of the model where the probability distribution of topics is modeled as a function of an inferred prior distribution which is modeled as a function of a flat prior distribution.

In an embodiment, the model is further improved by modeling words as a function of call-specific topics which are modeled as a function of the probability distribution of words for various topics, thereby reducing the number of topics generated based on regional or personal variants in conversation.

In an embodiment, a method comprises receiving call transcript data comprising an electronic digital representation of a verbal transcription of a call between a first person of a first person type and a second person of a second person type; splitting the call transcript data into first person type data comprising words spoken by the first person in the call and second person type data comprising words spoken by the second person type in the call; storing a topic model, the topic model simultaneously modeling the first person type data as a function of a first probability distribution of words used by the first person type for one or more topics and the second person type data as a function of a second probability distribution of words used by the second person type for the one or more topics, both the first probability distribution of words and the second probability distribution of words being modeled as a function of a third probability distribution of words for the one or more topics; using the topic model, determining a topic of the call; storing the call transcript data with additional data indicating the topic of the call.

2.0 Structural Overview

FIG. 1 depicts an example system for performing topic modeling on call transcripts. FIG. 1, and the other drawing figures and all of the description and claims in this disclosure, are intended to present, disclose and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problem of automated, programmatic determination of topics in digitally stored natural language texts or transcripts. Every step or operation that is functionally described in the disclosure is intended for implementation using programmed instructions that are executed by computer. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, a server computer 110 is communicatively coupled to client computing device 120 over network 100. Network 100 broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, client computing device 120, and other elements of the system may each comprise an interface compatible with the network 100 and are programmed or configured to use standardized protocols for communication across the networks such as TCP/IP, Bluetooth, and higher-layer protocols such as HTTP, TLS, and the like.

The client computing device 120 is a computer that includes hardware capable of communicatively coupling the device to one or more server computers, such as server computer 110, over one or more service providers. For example, client computing device 120 may include a network card that communicates with server computer 110 through a home or office wireless router (not illustrated in FIG. 1) coupled to an internet service provider. The client computing device 120 may be a smart phone, personal computer, tabled computing device, PDA, laptop, or any other computing device capable of transmitting and receiving information and performing the functions described herein.

The server computer 110 may be implemented using a server-class computer or other computer having one or more processor cores, co-processors, or other computers. The server computer 110 may be a physical server computer and/or virtual server instance stored in a data center, such as through cloud computing.

In an embodiment, server computer 110 receives call transcripts 112 over network 100 from client computing device 120. The call transcripts may comprise an electronic digital representation of a verbal transcription of calls between two or more parties. For example, a call transcript for a call dealership may comprise written dialogue between an agent and a customer that has been transcribed from an audio conversation between the agent and the customer. The call transcripts may include data labeling portions of the dialogue with identifiers of the parties and/or party types. For example, when used for conversations between a customer and a goods or services provider, the portions of the dialogue may be labeled based on whether the portions were spoken by the customer or by an agent of the goods or services provider.

In an embodiment, server computer 110 stores a topic model 114. The topic model 114 comprises computer readable instructions which, when executed by one or more processors, cause the server computer 110 to compute one or more output topics based on input call transcripts 112. The topic model 114 may comprise a mathematical model that is trained at the server computer 110 or trained at an external computing device and provided to server computer 110.

Call transcripts 112 are evaluated by the server computer 110 by using the call transcripts 112 as input into the topic model 114. Using the topic model 114, as described further herein, the server computer 110 identifies one or more topics for the call transcripts. The server computer then stores categorized call transcripts 116 including the call transcripts with data identifying the one or more topics. In an embodiment, further data is stored relating to the one or more topics. For example, the server computer 110 may store data identifying a length of a portion of a call corresponding to a particular topic, such as multiple topics are discussed during a single call. In some embodiments, the server computer removes the call transcripts from storage after a topic has been identified. The server computer may instead store the call topics and summary information from the call transcripts.

In an embodiment, the server computer generates topic data 118 from a plurality of categorized call transcripts 116. The topic data 118 may comprise aggregated information from a plurality of categorized call transcripts 116. For example, the topic data may identify each of a plurality of topics, average length of time spent on each topic per call, total amount of time spent on each topic, and/or other aggregated information regarding the call transcripts or modeled topics.

For purposes of illustrating a clear example, FIG. 1 shows a limited number of instances of certain functional elements. However, in other embodiments, there may be any number of such elements. For example, embodiments with multiple client computing devices may include a first client computing device or first plurality of client computing devices which sends the call transcripts to the server computer and a second client computing device or second plurality of client computing devices which receives the topic data from the server computer. Further, the server computer 110 may be implemented using two or more processor cores, clusters, or instances of physical machines or virtual machines, configured in a discreet location or co-located with other elements in a datacenter, share computing facility, or cloud computing facility.

3.0 Functional Overview

Figure 2:
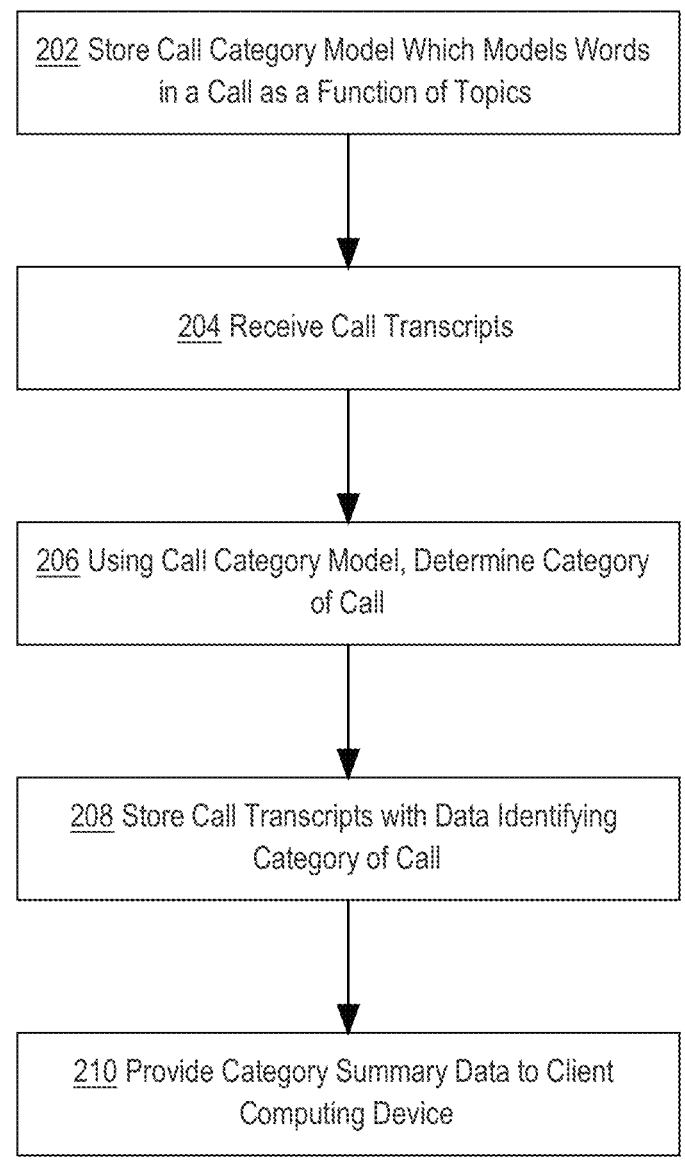
FIG. 2 depicts an example method of using a topic model to identify topics of audio dialogues based on call transcripts.

FIG. 2 depicts an example method of using a topic model to identify topics of audio dialogues based on call transcripts.

At step 202, a topic model is stored which models words as a function of topics. For example, a topic model may model specific words spoken on a plurality of calls by identifying a latent set of one or more themes or topics which are shared across all calls. Examples of the topic model are described further herein. The server computer may store a model trained for a particular customer using previously received transcripts. The training of the topic model may be performed at the server computer and/or at an external computing device.

At step 204, call transcripts for a call are received. The call transcripts may comprise electronic digital representations of verbal transcriptions of the call. For example, the call transcripts may include transcribed dialogue from a telephonic communication. The transcribed dialogue may uniquely identify the different parties to the conversation. In an embodiment, the different parties are identified as a person type, such as agent and customer. Tags may be placed in the transcriptions of the call which identify, for a block of dialogue, the party or party type which spoke the block of dialogue in the call. The call transcripts may additionally comprise metadata, such as timestamps for one or more blocks of text, total call length, or other call information. Receiving the call transcripts may comprise receiving the call transcripts from an external computing device and/or generating call transcripts from an audio file received from an external computing device and receiving the call transcripts from memory of the server computer.

At step 206, the topic model is used to determine a topic of the call. For instance, the server computer may execute instructions to run the trained topic model using the call transcript as input to identify one or more topics discussed in the call. In an embodiment, the call transcript is augmented by the server computer prior to execution of the topic model to transform the call transcript into data which can be read by the topic model. The transformations may include editing the call transcription to change its form so it can be read by the topic model, such as by removing pieces of metadata, changing the file structure of the call transcripts, or splitting the call transcript based on person type, as described further herein.

In an embodiment, determining a topic of the call includes one or more post-processing steps. For example, the topic model may determine, for each word, probabilities of different topics given the word. The server computer may execute one or more post-processing steps to determine, from these probabilities, whether a topic was discussed during a call. The post-processing steps may include aggregating probabilities and/or evaluating one or more criteria. For example, the server computer may determine that a topic was discussed during a call if greater than a threshold number of words spoken during the call had greater than a threshold probability of being spoken given a particular topic. As a practical example, if more than fifteen words were spoken that had over 60% probability of being spoken given a particular topic, the server computer may determine that the particular topic was discussed during the call. The rules may vary based on implementation and may include other thresholds, such as percentage of words spoken in a particular time/word window, or other types of rules, such as rules which use aggregated values and/or maximum percentage values. The rules and thresholds may be configured in advance generally and/or for a specific implementation.

At step 208, the call transcripts are stored with data identifying the topic of the call. For example, the server computer may store the call transcripts with metadata identifying one or more topics discussed during the call as identified by the topic model. The server computer may additionally store metadata identifying other attributes of the call, such as length of time spent on each topic. In an embodiment, the server computer separately stores the topic data. For example, the server computer may increment a call topic value by one for each call in which the topic was discussed. Additionally or alternatively, the server computer may store a data record for each call transcript which identifies at least one or more call topics of the call. The data record may additionally identify a date and/or time of the call, a length of the call, a length of time spent discussing each topic, an outcome of the call, or other data relating to the call and/or topic.

At step 210, topic summary data is provided to a client computing device. For example, the server computer may cause display of a graphical user interface on the client computing device which displays aggregated topic summary data. Example displays are described further herein. The server computer may additionally or alternatively provide call transcripts with topic identifiers and/or data records for each of a plurality of call transcripts which identify at least one or more call topics of the call.

4.0 Topic Models

Topic modeling may be improved using one or more of the methods described herein. While improvements are sometimes described depicted together, a person of skill in the art would understand that the improvements may be independently applied to the topic model unless the improvements are specified to be dependent on previous improvements. For example, the party segregation improvements described in section 4.2 may be used on the word side of the topic model without the improvements to the topic side of the topic model described in section 4.2.

The topic models described herein comprise mathematical models described at a level that a person of skill in the art would be able to make and use the model without undue experimentation. Where improvements to the underlying mathematics of the models are described, sufficient equations are provided to allow one of skill in the art to make and use a model with the improvements.

Generally, the topics comprise probabilistic models for each of the words spoken on every call. These probabilities are modeled as functions of the topics relevant to the application, the vocabulary associated with each topic, and of how prevalent each topic is. In order to infer the topics from observed data, any standard technique, such as Markov-chain Monte Carlo, variational inference, maximum likelihood estimation, or other inference techniques, may be used to estimate the model parameters.

4.1 Latent Dirichlet Allocation Topic Model

Figure 3:
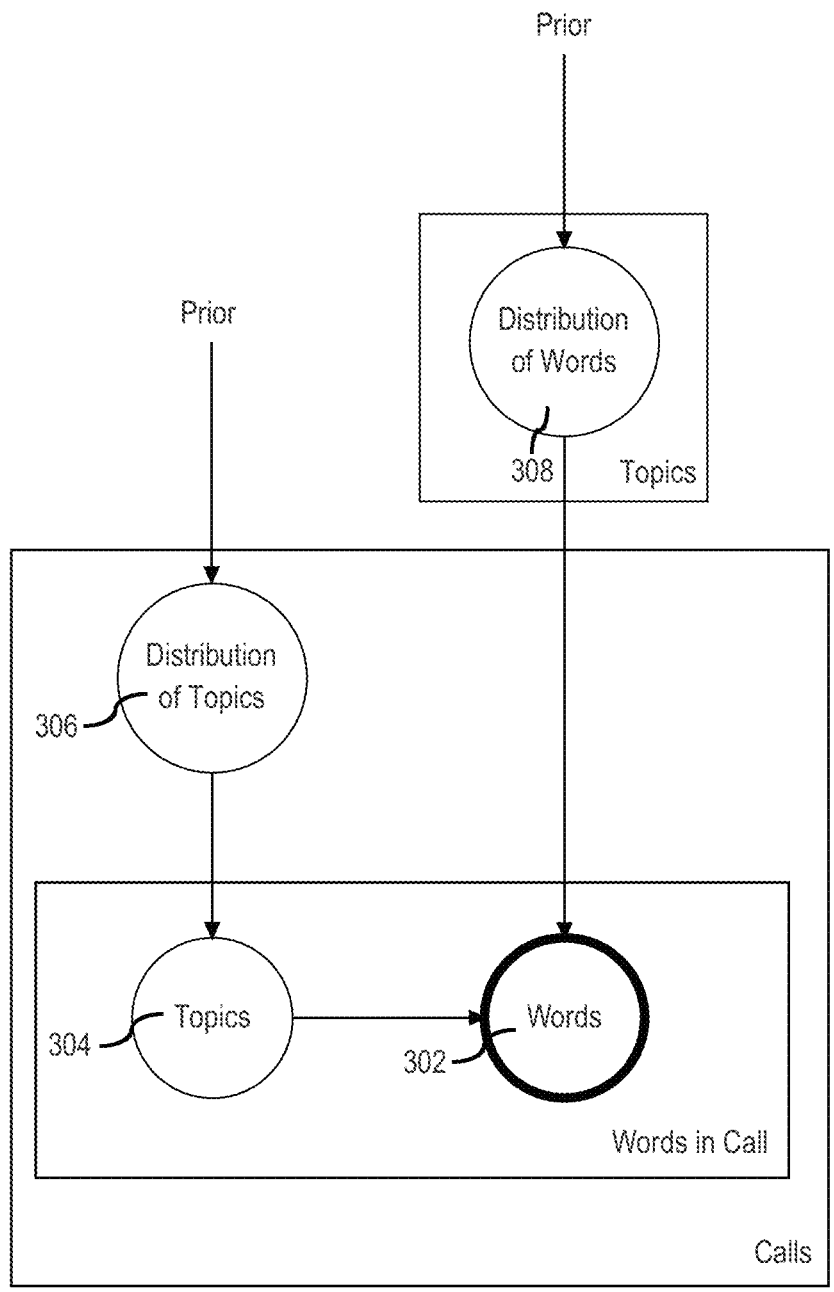
FIG. 3 depicts an example of a latent Dirichlet allocation (LDA) topic model.

FIG. 3 depicts an example of a latent Dirichlet allocation (LDA) topic model. In the models depicted in FIG. 3-5, the bolded circles represent data while the remaining circles represent probability distributions over the elements below them. The squares represent repetition of the model across an attribute, such as words in the call or all topics. The lines represent the modeling of one set of data as a draw from the above distribution of data. Finally, the bolded circle represents known input data, such as the words spoken in a call.

In the LDA topic model, each word of words 302 is modeled as a sample from the topics 304 which represent one or more topics spoken on the call. Topics 304 represent one of several variables being calculated through the topic model. Each word of words 302 is thus modeled as a probability of that word occurring given a topic of topics 304 being spoken in the call and a probability of that topic occurring on the call. As denoted by the box around these two circles, this modeling is repeated for all words in the call.

On the topic side of the model, the topics 304 are modeled as being drawn from a distribution of topics 306 for each call. In the LDA model, topics 304 are modeled from the distribution of topics 306 using a categorical model, such as a generalized Bernoulli distribution. Thus, in each call, there is assumed to be a probability distribution of topics 304 for each word of words 302. The probability distribution of topics 304 is assumed to be drawn from an overall call distribution of topics 306, Each word of words 302 is thus modeled as being drawn from that word's probability distribution of topics 304. This portion of the model is repeated across all calls which are used as input data into the model. The distribution of topics is modeled as being drawn from a prior distribution. In the LDA model, the prior distribution is a uniform prior distribution.

On the word side of the model, the words 302 are modeled as being drawn from a distribution of words 308 for each topic. In the LDA model, words 302 are modeled from the distribution of words 308 using a categorical distribution. The distribution of words 308 is replicated over topics, indicating that there exists a distribution of words for each of distinct topic of topics 304. Thus, words 302 are modeled as being drawn from a distribution of words 308 given one or more topics. The distribution of words is also modeled as being drawn from a prior distribution. In the LDA model, the prior distribution is a uniform prior distribution.

The LDA model is trained using input data from previous conversations. The input data comprises data from a plurality of previous calls. The data for each call comprises the words spoken on the call and identified topics for the call. Using the input data, the parameters for the different distributions can be calculated. A generative process is then run to model the topics 304 as a function of the words 302 spoken on the call. This can be done through Bayesian updating, such as by using Gibbs sampling, or through any other type of Monte Carlo simulation.

When a new dataset is received, the new dataset comprising a transcription of a call, the system uses the model to compute one or more of a set of topics spoken on the call, a probability of each of the set of topics spoken on the call, a topic for each word spoken on the call, and/or a probability of each of the topic for each word spoken on the call.

4.2 Improved Topic Model for Calls

Figure 4:
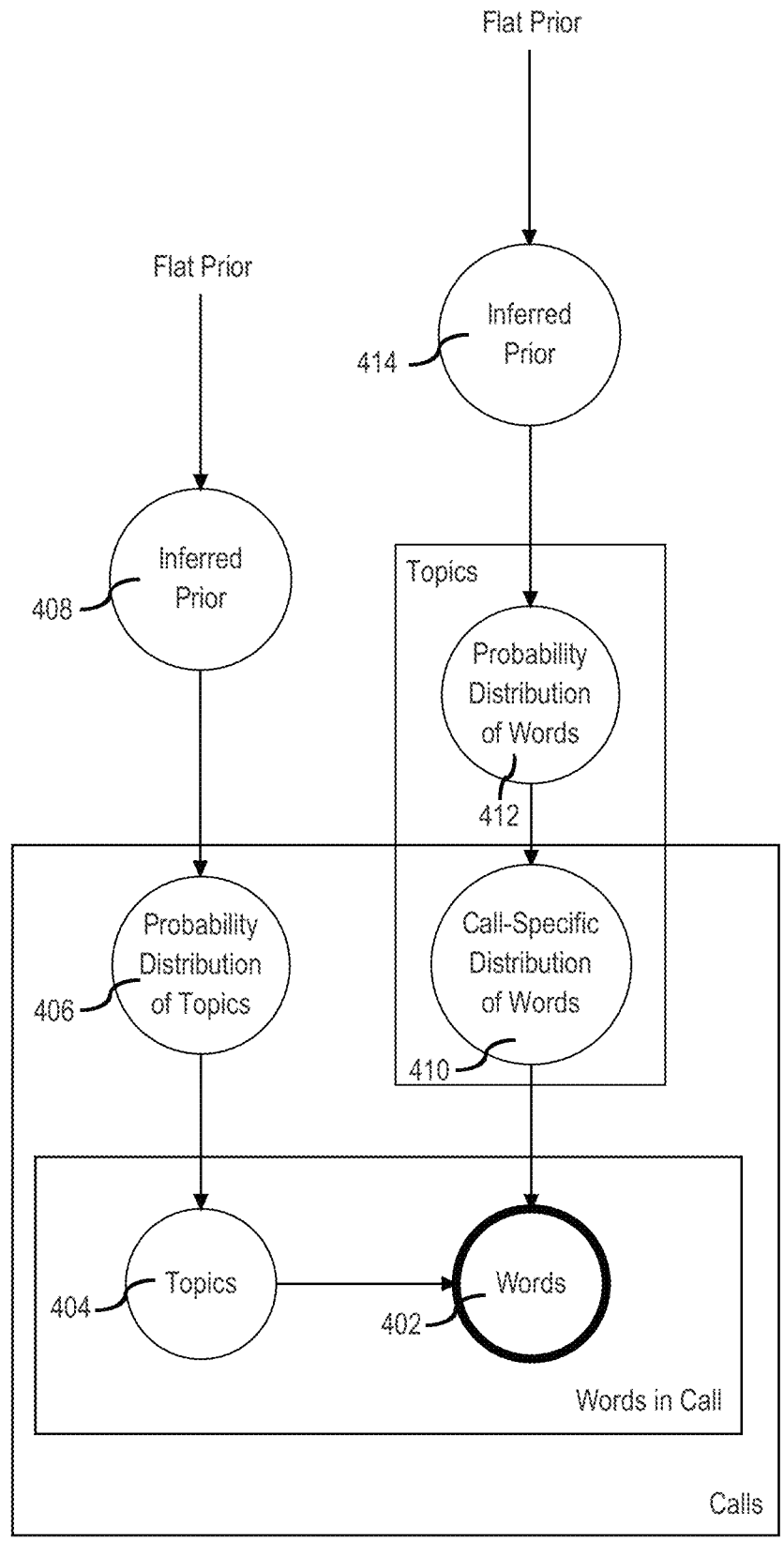
FIG. 4 depicts an example of an improved topic model which captures the non-uniformity in probabilities of certain topics discussed.

FIG. 4 depicts an example of an improved topic model which captures the non-uniformity in probabilities of certain topics discussed. The LDA model assumes that each topic has an equal probability of being pulled from the prior distribution. In actuality, certain topics are more likely to occur. For example, repair calls may be more common than sales calls for a car dealership as a sale only occurs once per lifecycle of a car while repairs may be performed multiple times during the lifecycle of a car.

In the improved model of FIG. 4, each of words 402 is modeled as a sample from per-word topic distributions 404. Similar to the LDA model, the topics in each call are modeled as being pulled from a distribution of topics 406. This process is repeated across all calls. Up to this point, the model has been similar to the LDA model. An improvement to the model of FIG. 4 is that while the LDA model models the distribution of topics as a sample from a Dirichlet distribution with a uniform prior, the model of FIG. 4 infers the prior distribution 408 which itself is modeled as a draw from a distribution with a uniform prior. In an embodiment, the model of FIG. 4 is further improved by using a Pitman-Yor process to model probabilities over each of the distributions. As the Pitman-Yor process is more flexible and better suited to language than the Dirichlet distribution used for the LDA model, the model's performance is improved through the use of the Pitman-Yor process. For instance, the Pitman-Yor process can model power-law distributions which better match distributions of words in language, thus providing more accurate and more efficient models.

An example method of modeling topics 404 as being drawn from a distribution of topics 406 which is drawn from an inferred prior distribution 408 draft from a flat prior distribution is described herein. Assuming topics (z) in a call are drawn from distribution of topics (θ) over a plurality of calls which are drawn from prior distribution (α) which is drawn from a flat prior distribution ($\alpha_0$), a probability of a particular topic being drawn may be computed as P(α, θ, z|$\alpha_0$) where only $\alpha_0$ is a known variable. Given that the distributions α and θ are unknown, the distributions are described in terms of customer counts c, representing tallies of data within the distribution, which are partitioned into a set of latent counts called table counts t which represent the fraction of the customer counts which get passed up the hierarchy to inform the parent distribution, i.e. the number of customer counts that show up in the parent node or $c_k^\alpha = t_k^\theta$. Using customer and table counts, the probability of a topic may be computed as:

$$P(c^\theta, t^\theta, c^\alpha, t^\alpha, z | \alpha_0) = \left[ \prod_J \left[ \frac{(b^\theta | a^\theta)_{T_j^\theta}}{(b^\theta)_{C_j^\theta}} \prod_K \frac{S_{t_{j,k}^\theta}^{c_{j,k}^\theta}}{H_{t_{j,k}^\theta}^{c_{j,k}^\theta}} \right] \left[ \frac{(b^\alpha | a^\alpha)_{T^\alpha}}{(b^\alpha)_{C^\alpha}} \prod_K \frac{S_{t_k^\alpha}^{c_k^\alpha}}{H_{t_k^\alpha}^{c_k^\alpha}} \right] \left[ \prod_K \alpha_{0_k}^{a_0} \right] \right]$$

where the distribution of topics has dimension K and size J. The term S is an unsigned Stirling number of the first kind. The terms a and b are parameters of the Pitman-Yor process known as the discount and concentration, respectively. They may be considered fixed values or sampled using any known sampling technique. The function H is the choose function, also known as the binomial coefficient. The terms C and T are summations of the customer and table counts, respectively. Thus, C≡$\Sigma_k c_k$ and T≡$\Sigma_k t_k$. The terms (b|a)$_T$ and (b)$_c$ are Pochhammer symbols that have the identity of:

(b|a)$_T$≡b(b+a)(b+2a) . . . (b+(T−1)a)

(b)$_c$≡b(b+1)(b+2) . . . (b+C−1).

As the customer counts in the above equation are a deterministic tally of data from x, the server computer may compute the probability above by sampling the table counts using a Gibbs sampler. Additionally or alternatively, a table indicator (u) may be defined as a Boolean variable indicating whether or not a data point created a new table count: $t_k = \Sigma_{n=1}^{c_k} u_{n,k}$. The server computer may sample the table indicators instead of the table counts to reduce the computational cost of sampling table counts. Bayes theorem may then be used to compute the probability of a given data point using the above equations and table counts sampled from the Gibbs sampler. For example, the server computer may compute the probability of a particular data point being absent and divide the probability above by the probability of the absent data point to compute the joint probability for the latent variables associated with the data point. Samples can be drawn from the resulting equation and latent variables may be stored for the data point. The server computer may then continue this process for each additional latent variable.

In the improved model of FIG. 4, a second improvement is displayed in the word side of the model. The LDA model assumes that each topic has a single distribution of words associated with it. While often true in text, language used in speech can vary from region to region or person to person based on differences in dialect and manner of discussing the same topic. Thus, the LDA model may identify a plurality of topics, one for each region or personal style of discussing a topic. In the improved model of FIG. 4, a call-specific distribution of words 410 is modeled as being pulled from a corpus-wide probability distribution of words 412 for each topic of a plurality of topics. Words 402 in each call are thus modeled as being drawn from call-specific distributions of words 410 replicated across a plurality of topics.

As a further improvement, as with the topic side of the model, the probability distribution of words 412 is modeled as being drawn from an inferred prior distribution 414 which is drawn from a flat prior distribution. This process may be modeled using a Dirichlet distribution or Pitman-Yor Process. An example method of modeling words 402 as being drawn from a call-specific probability distribution of words 410 which is drawn from probability distribution of word 412, drawn from an inferred prior distribution 414, drawn from a flat prior distribution is described herein. Assuming words (w) in a call are drawn from a call-specific probability distribution for the call (ψ) which are drawn from a probability distribution of words (ϕ) for each of a plurality of topics which is drawn from an inferred prior distribution (β) which is drawn from a prior distribution ($\beta_0$), a probability of a word being drawn from the model may be computed as:

$$P(w, \psi, \phi, \beta | \beta_0) = \left[ \prod_V \beta_{0,v}^{\beta_0} \right] [f^\beta] \left[ \prod_K f^{\phi_k} \right] \left[ \prod_K \prod_D f^{\psi_{d,k}} \right]$$

where v ranges over the dimension of the node V which represents the size of the vocabulary of words, k ranges over the dimension of the node K which represents the number of topics on the topic side of the model, d ranges over the dimension of the node D which represents the number of calls, and where:

$$f^N \equiv \frac{(b^{(N)} | a^{(N)})_{T^{(N)}}}{(b^{(N)})_{C^{(N)}}} \prod_J \frac{S_{t_j^{(N)}}^{c_j^{(N)}}}{H_{t_j^{(N)}}^{c_j^{(N)}}}$$

Where j indexes over the dimension of the distribution (i.e., J=K on the topic side of the model, and J=V on the word side of the model).

Improvements on either side of the model described above may be utilized independent of each other by using the depicted equations along with the equations of the LDA model. Additionally or alternatively, the two probabilities may be combined to compute the probability P(z, θ, α, w, ψ, ϕ, β|$\beta_0$, $\alpha_0$) in the improved model of FIG. 4 using the equation below:

$$P = \left[ \prod_V \beta_{0,v}^{\beta_0} \right] [f^\beta] \left[ \prod_K f^{\phi_k} \right] \left[ \prod_K \prod_D f^{\psi_{d,k}} \right] \times \left[ \prod_K \alpha_{0,k}^{c_k^{\alpha_0}} \right] [f^\alpha] \left[ \prod_D f^{\theta_d} \right]$$

where the first part of the equation represents the word branch and the second part of the equation represents the topic branch.

As with the topic branch improvement described above, a Gibbs sampler may be defined which samples table counts from the dataset to compute a resulting probability from the above equation with Bayes theorem being used to compute the probability of a topic given the words spoken in a call.

Since the $f^N$ terms are the only ones with table counts, a term may be defined as:

$$R^{(N)} \equiv \frac{f^{(N)}}{f^{(N)}_{-d,n}}$$

where $f^{(N)}_{-d,n}$ is the state of the model with the word $w_{d,n}$ removed. The server computer may sample from the above equation and compute the product of $R^{(N)}$ across all nodes to produce the latent variables for each word $w_{d,n}$ in the dataset.

To obtain the state of the model with a word removed, the system may sample P(z, θ, α, w, ψ, φ, β|β$_0$, α$_0$) as computed above. Table indicators for the model with the word removed may be sampled from the following equation:

$$u_{d,n} \sim Bern\left(\frac{t_{z_{d,n}}}{c_{z_{d,n}}}\right).$$

While sampling the state of the model with the word $w_{d,n}$ removed, the server computer may check the following constraints: t≤c and t=0 if an only if c=0. If either constraint is violated, the server computer may restore the state of the model and continue the process with the next word.

The improvements of the model of FIG. 4 allow the server computer to more accurately model topics from a conversation by taking into account variances in topic likelihoods and variances in the way different people discuss different topics. Thus, the server computer is able to more accurately determine topic models with less input information, thereby decreasing the computational cost of providing accurate topic categorizations of phone calls. Additionally, the higher accuracy of the topic model of FIG. 4 decreases the need for post-processing steps to clean or otherwise alter results of the topic model, thereby reducing resources used in computing topics for individual conversations.

4.3 Improved Topic Model with Party Segregation

Figure 5:
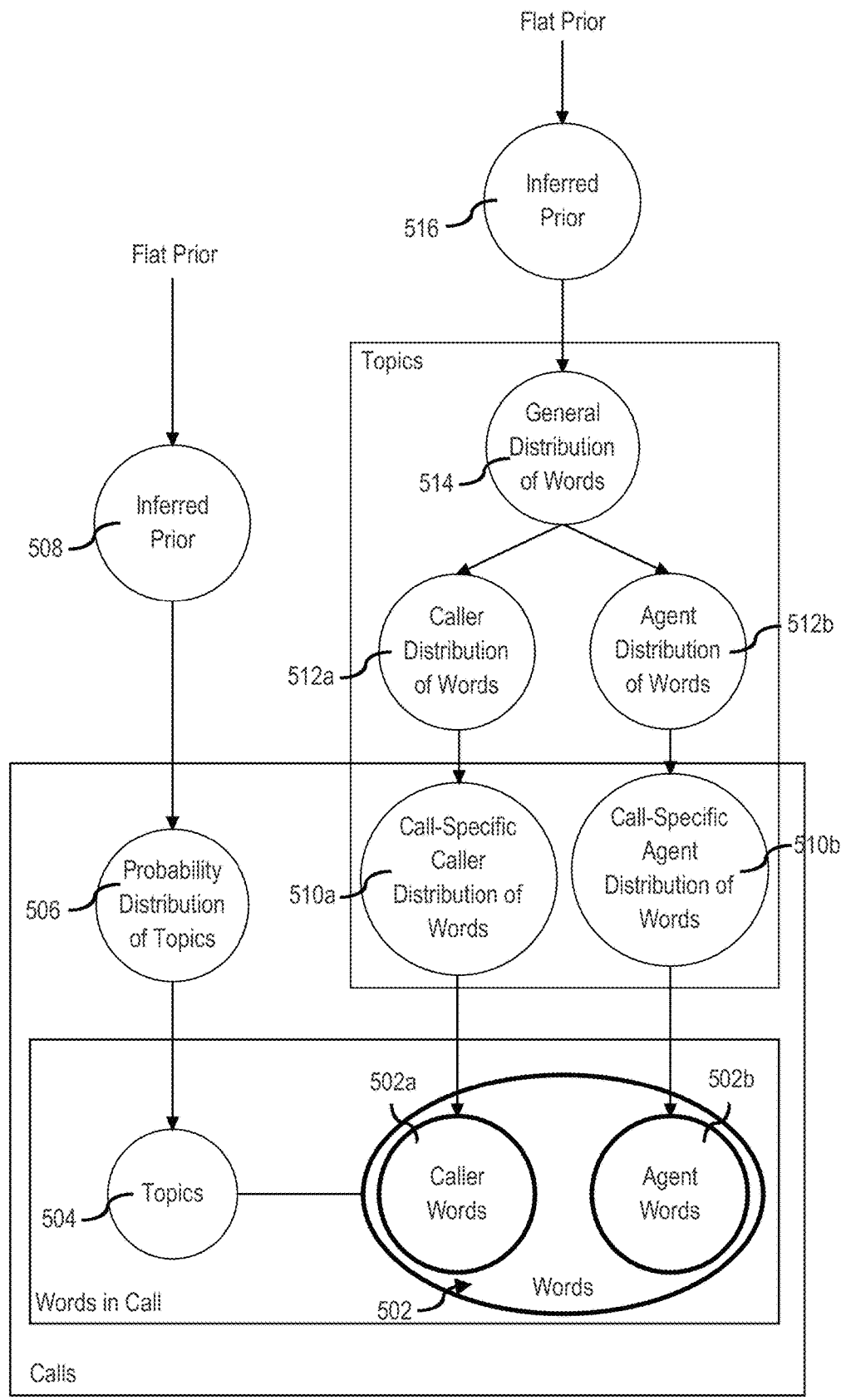
FIG. 5 depicts an example of an improved topic model which segregates parties of the conversation.

FIG. 5 depicts an example of an improved topic model which segregates parties of the conversation. The LDA model and the model of FIG. 4 both treat all words in a phone conversation as coming from a singular source when sampling from distributions of words. Thus, agent dialogue, which is often scripted or based on specific language provided to the agent for use in different calls, is mixed with the customer's language, which often varies across individuals. The differences in how customers speak and how agents speak are not captured by the model which treats all words as coming from the same source.

The topic side of the model of FIG. 5 is similar to the topic side of the model of FIG. 4. Topics 504 for words in a call are modeled as being drawn from a distribution of topics 506 in each call which is modeled as being drawn from an inferred prior distribution 508 which is drawn from a flat prior distribution. This process may be modeled using a Dirichlet distribution or Pitman-Yor Process.

On the word side of the model, prior to training the model the server computer may split words 502 into two sets of words, first person type words and second person type words. The first person type and second person type refer to types of people for a specific implementation of the model. For example, some businesses may split the calls into caller words 502a and agent words 502b. The model does not depend on the types of people being callers and agents and other implementations may be executed with the model of FIG. 5 provided that the calls comprise at least two topics of people. For example, campaigning calls may be split between campaign representative and voters.

While the model is described below with respect to person type distinctions, the segregation techniques described herein may segregate words in the model using any type of metadata. For example, instead of caller-specific and agent-specific distributions of words, there may be seasonal distributions of words, regional distributions of words, or any combination of segregated distributions. As is described below, a benefit of the topic model of FIG. 5 is its scalability to multiple topic segregations. Thus, there could be a distribution of words for each combination of caller/agent and season. This also allows for customization of a topic model to a specific type of business. For example, a topic model can be customized for a car dealership with a sale-time distribution, a new car release time distribution, and a distribution for non-sale and non-release times.

Each of the segregated sets of words are modeled simultaneously on person type-specific distributions. Thus, caller words 502a are modeled as being drawn from a call-specific caller distribution of words 510a which is modeled as being drawn from a caller distribution of words 512a which is drawn from an overall distribution of words 514 for the topic. Similarly, agent words 502b are modeled as being drawn from call-specific agent distribution of words 510b which is drawn from an agent distribution of words for the topic 512b, which is drawn from the general distribution of words 514 for each topic. Thus, while the caller words and agent words are separately modeled based on caller-specific and agent-specific distributions of words, both sets of distributions are modeled as being drawn from a general distribution of words 514 which is modeled as being drawn from an inferred prior distribution 516 which is modeled as being drawn from a flat prior distribution.

An example method of modeling words 502 by simultaneously modeling first person type data as a function of a first probability distribution of words used by the first person type for and the second person type data as a function of a second probability distribution of words used by the second person type, where both probability distributions are modeled as a function of a third probability distribution of words for one or more topics is described herein. As an example, the server computer may compute the probability P(z, θ, α, w, ψ, φ, β|β$_0$, α$_0$) for a plurality of speakers, S, using the equation below:

$$P = \left[\prod_V \beta_{0,v}^{\beta_0}\right][f^\beta]\left[\prod_K f^{\eta_k}\right]\left[\prod_S \prod_K f^{\phi_{k,s}}\right]$$
$$\left[\prod_S \prod_K \prod_D f^{\psi_{d,k,s}}\right] \times \left[\prod_K \alpha_{0,k}^{c_k^{\alpha_0}}\right][f^\alpha]\left[\prod_D f^{\theta_d}\right]$$

where the distribution η is the general distribution of words and φ$_s$ is a distribution of words for an individual party to the call. Given that the addition of parties adds to the product of the terms with the s subscript, the model described above can be extrapolated to include any number of parties. As described above, sampling for the models described herein comprises sampling table counts for each node. Given that $c_k^\mu = t_k^\nu$, table counts are used to inform the customer counts of the parent nodes. When a node has more than one child node, such as the general distribution of words 514, the table counts are summed across all children nodes. In order to increase the computational efficiency of summing the table counts, a hierarchical structure is defined where related sets of distributions are grouped together into nodes and related sets of nodes are grouped into layers. Where a parent node is drawing from a child node of the same size, each draw from a probability distribution of the child node may be passed to a corresponding distribution of the parent. Where a parent node with a single distribution draws from a child node with multiple distributions, the number table counts are summed across all children. If a number of distributions in a child node does not match a number of distributions in a parent node, the parent nodes may sum over a random or pseudo-random variable number of distributions in the child node while tracking which children nodes to sum over.

4.4 Topic Model Generator

In an embodiment, the server computer provides a topic model generator to the client computing device. The topic model generator, as used herein, refers to providing options for specifying nodes in a topic model which is then computed by the server computer. The topic model generator may comprise a graphical user interface with options for selecting and adding nodes to a graph and/or a text file with a designated structure such that adding nodes to the graph comprises editing data in the text file to identify nodes to be added to the graph in different locations.

Figure 6:
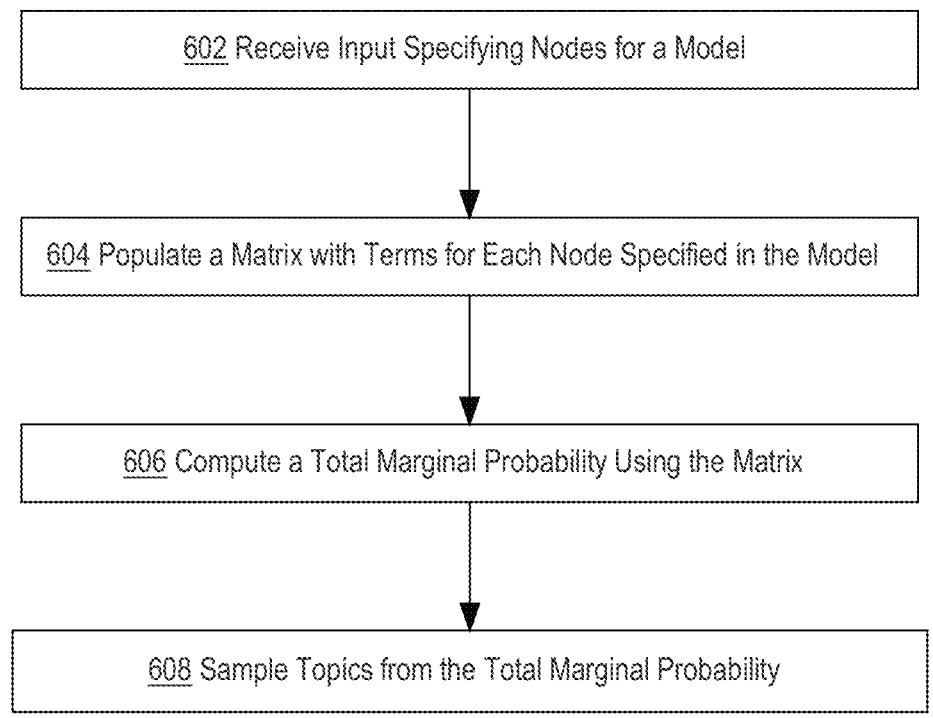
FIG. 6 depicts an example an example method for dynamically building a model based on user input.

FIG. 6 depicts an example method for dynamically building a model based on user input. At step 602, input is received specifying nodes for a model. For example, the server computer may receive a request to build a topic model with a plurality of nodes. The request may include call transcripts to be categorized through the topic model and/or specify a set of stored call transcripts to be categorized through the topic model. The input may specify nodes for both the topic side of the model and the word side of the model. The input may be received through a graphical user interface or through a text file specifying the building of a model based on particular nodes.

At step 604, the server computer populates a matrix with terms for each node specified in the model. For example, a matrix may be defined with terms that rely on the table counts, using the variable $R^{(N)}$ as defined above. The columns of the matrix may correspond to topics (k), while the rows correspond to the nodes specified by the user input. The first row of the matrix may refer to the lowest child node aside from the final word or topic node. Thus, the first row is populated with terms for when u=0 on the lowest child node aside from the final word or topic node. The next row corresponds to the next lowest child node. Thus, u=0 for the next lowest child node and u=1 for the lowest child node. An $R^{(N)}$ is only added to the matrix for a parent node when u=1 for its child node. While computing the probability over all states of the model could cause the sampling task to become exponentially more computationally complex for each node added to the model, the server computer may restrict analysis to only possible states of the model. The server computer may store the possible states in a two-dimensional matrix which is then used to compute the values in the matrix described above.

As an example, a matrix for both the topic branch ($p^{topic}$) and the word branch ($p^{word}$) described in FIG. 4 may be computed as:

$$p^{topic} \equiv \begin{bmatrix} R^{\theta}_{k=0,u=0} & R^{\theta}_{k=1,u=0} & \cdots \\ R^{\theta}_{k=0,u=1} R^{\alpha}_{k=0,u=0} & R^{\theta}_{k=1,u=1} R^{\alpha}_{k=1,u=0} & \cdots \\ R^{\theta}_{k=0,u=1} R^{\alpha}_{k=0,u=1} R^{\alpha_0}_{k=0,u=0} & R^{\theta}_{k=1,u=1} R^{\alpha}_{k=1,u=1} R^{\alpha_0}_{k=1,u=0} & \cdots \end{bmatrix}$$

$$p^{word} \equiv \begin{bmatrix} R^{\psi}_{k=0,u=0} & R^{\psi}_{k=1,u=0} & \cdots \\ R^{\psi}_{k=0,u=1} R^{\phi}_{k=0,u=0} & R^{\psi}_{k=1,u=1} R^{\phi}_{k=1,u=0} & \cdots \\ R^{\psi}_{k=0,u=1} R^{\phi}_{k=0,u=1} R^{\beta}_{k=0,u=0} & R^{\psi}_{k=1,u=1} R^{\phi}_{k=1,u=1} R^{\beta}_{k=1,u=0} & \cdots \\ R^{\psi}_{k=0,u=1} R^{\phi}_{k=0,u=1} R^{\beta}_{k=0,u=1} R^{\beta_0}_{k=0,u=0} & R^{\psi}_{k=1,u=1} R^{\phi}_{k=1,u=1} R^{\beta}_{k=1,u=1} R^{\beta_0}_{k=1,u=0} & \cdots \end{bmatrix}$$

where each column corresponds to an increasing value of k and each row includes an additional $R^{(N)}$ term for a parent of the last node in the previous row. Each position in the matrix thus represents a state for that branch of the model with its value representing the probability for the branch to take on that state. Thus, the system can build matrices with any number of nodes by adding rows for each requested node.

The matrix may be initiated based on the user input. First, a matrix may be generated with a number of rows equal to the number of nodes specified in the user input. Thus, if the user input specifies three nodes to be added to the final topic node, the server computer may generate a matrix with three rows. All elements in the matrix may be initialized to 1. Then, for l∈[1, depth−1], the server computer may compute the vectors $R_{k,u=0}^{l}$ and $R_{k,u=1}^{l}$, compute the product of $P_{l,k}$ and $R_{k,u=0}^{l}$, and, for m∈[l+1, depth], multiply $P_{m,k}$ and $R_{k,u=1}^{l}$. The server computer may then compute $R_{k,u=0}$ for the base node and compute the product of $P_{depth,k}$ by $R_{k,u=0}$.

At step 606, a total marginal probability is computed using the matrix. For example, the server computer may initially compute the partial marginal probabilities by summing each matrix along its depth axis. The total marginal probability may then be computed by multiplying the partial marginal probabilities elementwise.

At step 608, topics are sampled from the total marginal probability. For example, the server computer may evaluate the matrices defined in step 604 for each word within each dataset. The server computer may continue evaluating the matrix with different words until convergence is reached. The server computer may then use the matrices to compute the total marginal probabilities for each of a plurality of topics for each of the words in a dataset.

Using the method of FIG. 6, the server computer can generate a model on demand with nodes specified by a client computing device. By automatically generating and training a model based on user input, the server computer provides configurable models without requiring in-depth knowledge or expertise in generating conversation models.

5.0 Topic Display

In an embodiment, the server computer provides topic information to the client computing device. The topic information may indicate, for each of a plurality of topics, a number or percentage of calls received for that topic over a particular period of time. For example, the server computer may send calls received for different topics on an hourly, daily, weekly, or monthly basis. The server computer may additionally provide options to customize the topic information. For example, the server computer may provide an interface where a client computing device specifies a start time/date and an end time/date. The server computer may provide the topic information for the specified period of time by identifying each call received during that period of time and incrementing a topic counter for each topic when a call was identified as corresponding to the topic.

The server computer may provide graphs that depict the topic information to the client computing device. For example, the server computer may generate a histogram with the x-axis corresponding to time intervals, such as hours, days, or weeks, and the y-axis corresponding to a number or percentage of calls that were received for a topic. Separate histograms may be provided for each topic and/or a joint histogram may be generated which includes a plurality of bars for each time interval, each of the plurality of bars corresponding to a different topic of a plurality of topics.

In an embodiment, the server computer further identifies the words that correspond to each of the topics, such as by computing the probabilities for words individually and identifying corresponding probabilities for different topics. As the topics may not be named in advance, specifying the words with the highest probabilities of being associated with a topic allow for easier identification of the topic. If the server computer receives input naming a particular topic, the server computer may update stored data to include the name of that topic for other data sent to the client computing device.

The server computer may use the identified words for each of the topics to generate a word bubble display for the client computing device. The word bubble display may include a plurality of bubbles, each corresponding to a different topic. The size of the bubble may correspond to the frequency with which the topic is discussed, with larger bubbles corresponding to topics that are discussed more frequently and smaller bubbles corresponding to topics that are discussed less frequently. The bubbles may include words inside them that correspond to the topic of the bubble. For example, a bubble for the topic of purchasing a vehicle may include the words "car", "price", "financing", and "credit".

The server computer may provide a graphical user interface to the client computing device with the topic information. The graphical user interface may provide charts and graphs for different and/or customizable time periods corresponding to call data provided by the client computing device. The graphical user interface may comprise insights to the call data, such as origins and destinations of the calls within different topics retrieved from metadata. The graphical user interface may additionally provide options to rename topics and/or merge topics.

In an embodiment, the topic information is provided to a real-time bidding platform where users bid on calls based on keywords of the call or other information. The topic information may additionally be used to intelligently route calls from a source to a destination.

6.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
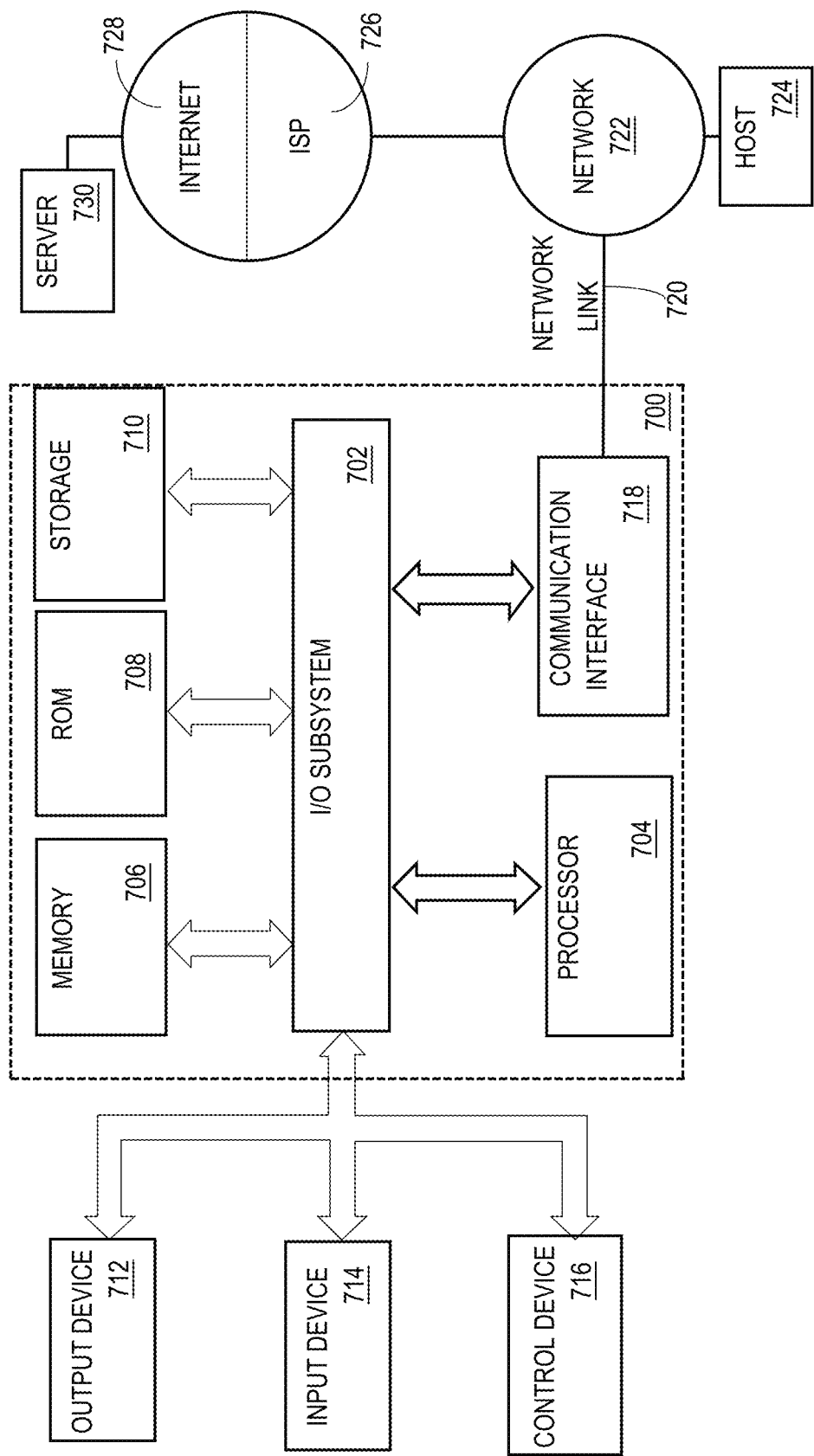
FIG. 7 is a block diagram that illustrates a computer system upon which an embodiment may be implemented.

For example, FIG. 7 is a block diagram that illustrates a computer system 700 upon which an embodiment may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams.

The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:

receiving call transcript data comprising an electronic digital representation of a verbal transcription of a current call between a first person of a first person type and a second person of a second person type;

splitting the call transcript data into first person type data comprising words spoken by the first person in the current call and second person type data comprising words spoken by the second person type in the current call;

storing a topic model, the topic model simultaneously modeling the first person type data as a function of a first probability distribution of words used by the first person type, over a plurality of calls, for one or more topics discussed in the current call and the second person type data as a function of a second probability distribution of words used by the second person type over the plurality of calls, for the one or more topics discussed in the current call, both the first probability distribution of words used by the first person type for the one or more topics and the second probability distribution of words used by the second person type for the one or more topics being modeled as a function of a third probability distribution of words for the one or more topics, the third probability distribution of words representing an overall probability distribution of words for each topic of the one or more topics discussed in the current call;

using the topic model, determining a topic of the call;

storing the call transcript data with additional data indicating the topic of the call.

2. The method of claim 1, wherein the topic model additionally models the call transcript data as a function of a plurality of topics which are modeled as a function of a plurality distribution of topics.

3. The method of claim 2, wherein the plurality distribution of topics is modeled as a function of an inferred prior probability distribution which is modeled as a function of a flat prior distribution.

4. The method of claim 1, wherein determining the topic of the call using the topic model comprises inverting the topic model using a Bayesian Belief Network.

5. The method of claim 1, wherein the third probability distribution of words for each topic is modeled as a function of an inferred prior probability distribution which is modeled as a function of a flat prior distribution.

6. The method of claim 5, wherein the third probability distribution of words is modeled as a function of the inferred prior probability distribution using a Pitman-Yor Process and the inferred prior probability distribution is modeled as a function of the flat prior distribution using a Pitman-Yor Process.

7. The method of claim 1, wherein the first person type is a caller type and the second person type is an agent type.

8. The method of claim 1, further comprising providing, to a client computing device, topic information indicating, for each of a plurality of topics, a number or percentage of calls received for that topic over a particular period of time.

9. A system comprising:

one or more processors;

a memory storing instructions which, when executed by the one or more processors, causes performance of:

receiving call transcript data comprising an electronic digital representation of a verbal transcription of a current call between a first person of a first person type and a second person of a second person type;

splitting the call transcript data into first person type data comprising words spoken by the first person in the current call and second person type data comprising words spoken by the second person type in the current call;

storing a topic model, the topic model simultaneously modeling the first person type data as a function of a first probability distribution of words used by the first person type, over a plurality of calls, for one or more topics discussed in the current call and the second person type data as a function of a second probability distribution of words used by the second person type over a plurality of calls, for the one or more topics discussed in the current call, both the first probability distribution of words used by the first person type for the one or more topics and the second probability distribution of words used by the second person type for the one or more topics being modeled as a function of a third probability distribution of words for the one or more topics the third probability distribution of words representing an overall probability distribution of words for each topic of the one or more topics discussed in the current call;

using the topic model, determining a topic of the call;

storing the call transcript data with additional data indicating the topic of the call.

10. The system of claim 9, wherein the topic model additionally models the call transcript data as a function of a plurality of topics which are modeled as a function of a plurality distribution of topics.

11. The system of claim 10, wherein the plurality distribution of topics is modeled as a function of an inferred prior probability distribution which is modeled as a function of a flat prior distribution.

12. The system of claim 9, wherein determining the topic of the call using the topic model comprises inverting the topic model using a Bayesian Belief Network.

13. The system of claim 9, wherein the third probability distribution of words for each topic is modeled as a function of an inferred prior probability distribution which is modeled as a function of a flat prior distribution.

14. The system of claim 13, wherein the third probability distribution of words is modeled as a function of the inferred prior probability distribution using a Pitman-Yor Process and the inferred prior probability distribution is modeled as a function of the flat prior distribution using a Pitman-Yor Process.

15. The system of claim 9, wherein the first person type is a caller type and the second person type is an agent type.

16. The system of claim 9, further comprising providing, to a client computing device, topic information indicating, for each of a plurality of topics, a number or percentage of calls received for that topic over a particular period of time.

17. A computer-implemented method comprising:

receiving call transcript data comprising an electronic digital representation of a verbal transcription of a call between a first person of a first person type and a second person of a second person type;

splitting the call transcript data into first person type data comprising words spoken by the first person in the call and second person type data comprising words spoken by the second person type in the call;

storing a topic model, the topic model simultaneously modeling the first person type data as a function of a first probability distribution of words used by the first person type for one or more topics and the second person type data as a function of a second probability distribution of words used by the second person type for the one or more topics, both the first probability distribution of words and the second probability distribution of words being modeled as a function of a third probability distribution of words for the one or more topics, the third probability distribution of words for each topic being modeled as a function of an inferred prior probability distribution which is modeled as a function of a flat prior distribution, the third probability distribution of words being modeled as a function of the inferred prior probability distribution using a Pitman-Yor Process and the inferred prior probability distribution is modeled as a function of the flat prior distribution using the Pitman-Yor Process;

using the topic model, determining a topic of the call;

storing the call transcript data with additional data indicating the topic of the call.

18. A system comprising:

one or more processors;

a memory storing instructions which, when executed by the one or more processors, causes performance of:

receiving call transcript data comprising an electronic digital representation of a verbal transcription of a call between a first person of a first person type and a second person of a second person type;

splitting the call transcript data into first person type data comprising words spoken by the first person in the call and second person type data comprising words spoken by the second person type in the call;

storing a topic model, the topic model simultaneously modeling the first person type data as a function of a first probability distribution of words used by the first person type for one or more topics and the second person type data as a function of a second probability distribution of words used by the second person type for the one or more topics, both the first probability distribution of words and the second probability distribution of words being modeled as a function of a third probability distribution of words for the one or more topics, the third probability distribution of words for each topic being modeled as a function of an inferred prior probability distribution which is modeled as a function of a flat prior distribution, the third probability distribution of words being modeled as a function of the inferred prior probability distribution using a Pitman-Yor Process and the inferred prior probability distribution is modeled as a function of the flat prior distribution using the Pitman-Yor Process;

using the topic model, determining a topic of the call;

storing the call transcript data with additional data indicating the topic of the call.

\* \* \* \* \*